United States Patent Office 2,786,815
Patented Mar. 26, 1957

2,786,815

COMPOSITION FOR BINDING COAL DUST

Heinz Buggisch, Koln-Ostheim, Johannes Müller-Römer, Koln-Bayenthal, and Hugo Nees, Frankfurt am Main, Germany, assignors to Chemische Fabrik Kalk G. m. b. H., Koln-Kalk, Germany No Drawing. Application August 16, 1954,
Serial No. 450,204

Claims priority, application Germany December 29, 1951

8 Claims. (Cl. 252—88)

The present invention relates to an improved composition, and process, for binding dust in coal mines and particularly for binding such dust on the ceiling, coal faces and pillars.

The dust which occurs in large quantities in coal mines is a constant source of annoyance and danger, as it is not only the cause of coal dust explosions but also of silicosis of the miners. Consequently, many attempts have been made to bind the dust occurring in the mines. For example, attempts have been made to lay the dust contained in the mine air by spraying with water or water containing wetting agents. Also, oils have been used instead of aqueous media for this purpose. It has also been proposed to bind the dust which has been deposited on the floors of the workings with the aid of hygroscopic salts, such as calcium chloride, by adding such salts to the water used in wetting down the floors or by sprinkling such hygroscopic salts on the floors.

Binding of the coal dust contained in the air in the mine upon the ceilings, walls and pillars of coal mines has presented a difficult problem for which no satisfactory solutions have previously been suggested. The materials previously employed for this purpose either did not have proper binding action upon the coal dust or were only comparatively short lived.

It is an object of the present invention to provide a material and process for laying coal dust in mines which not only has a good dust binding capacity but also effectively will bind the dust over comparatively long periods of time.

In accordance with the invention, it was found that this object could be attained with a dust laying composition containing a combination of a hygroscopic salt or mixture of hygroscopic salts, an organic water soluble surface active agent which is not attacked by the hygroscopic salt or salts, and an inorganic substance of gel-like nature, as a carrier for the hygroscopic salt or salts and surface active agent, the surface active agent and the gel-like substance each being present in a minor proportion with respect to the hygroscopic salt or salts.

The hygroscopic component of the composition according to the invention can, for example, be calcium chloride and/or magnesium chloride. Expediently the hygroscopic salts are mixed with the other materials in the form of aqueous solutions.

The surface active component of the composition according to the invention, for example, can be alkylphenolpolyglycol ethers containing 8 to 10 carbon atoms in the alkyl group and 20 to 24 carbon atoms in the polyglycol component, such as Stockopol W conc. (produced by Chemische Fabrik Stockhausen, Krefeld, Germany); benzyloxydiphenylpolyglycol ethers containing 28 to 38 carbon atoms in the polyglycol component, such as, Emulgator W (produced by Farbenfabriken Bayer, Leverkusen, Germany); and laurylpolyglycol ethers produced from 7 mols of ethyleneoxide and 1 mol of lauryl alcohol, such as Marlipal M G (produced by Chemische Werke Hüls, Marl, Germany).

The surface active agents mentioned are all of the non-ionic type and are compatible with the hygroscopic salts contained in the compositions.

The inorganic gel-like carrier substances employed according to the invention can suitably be prepared either directly before incorporation with the other components or they can be formed in situ in admixture with the other components by reacting alkali reacting substances, such as, alkali metal hydroxides, alkali metal carbonates or alkaline earth metal hydroxides, either in solid form or in the form of solutions, with water soluble salts of substances which are capable of forming gelatinous hydroxides, such as, magnesium salts, aluminum salts, zinc salts, iron salts and the like. Colloidal magnesium hydroxide is a preferred gelatinous substances for use in the compositions according to the invention. The colloidal magnesium hydroxide can be produced directly by triturating a mixture of hydrated lime and crystalline magnesium chloride in a proportion of 1 mol $Ca(OH_2)$ to 1–1.5 mol $MgCl_2.6H_2O$, until the mixture has liquefied to a pulp. The calcium chloride formed in the reaction remains in the composition according to the invention and forms a portion of the hygroscopic salt component.

The following proportions, on a water-free basis, are advantageously employed in the production of the coal dust laying compositions according to the invention: 1–1.5 pounds of hygroscopic salt, 0.07–0.14 pound of inorganic substance capable of forming a gel with the salt solution and about 0.04–0.08 pound of surface active agent. In order to obtain a composition of pasty consistency, about 1.8 to 2.7 pounds of water are required. For example, good coal dust laying compositions can be produced from 6–10 pounds hydrated lime, 20–33 pounds $MgCl_2.6H_2O$, 230–205 pounds of a 25–35% $CaCl_2$ solution and 2–5 pounds of surface active substance.

The concentration of the $CaCl_2$ solution employed in the preparation of the composition according to the invention depends upon the moisture content of the air in the coal mine in which the composition is to be employed to lay the coal dust. When the moisture content of such air is low, the following composition is preferably employed:

| | Pounds |
|---|---|
| Hydrated lime | 11 |
| $MgCl_2.6H_2O$ | 33 |
| Aqueous 35% $CaCl_2$ solution | 205 |
| Laurylpolyglycol ether (Marlipal M G) | 2.5 |

When the moisture content of such air is rather high, the following composition is preferably employed:

| | Pounds |
|---|---|
| Hydrated lime | 6 |
| $MgCl_2.6H_2O$ | 20 |
| Aqueous 25% $CaCl_2$ solution | 221 |
| Larylpolyglycol ether (Marlipal M G) | 2.5 |

These dust laying compositions according to the invention are preferably prepared by triturating finely pulverized hydrated lime with the crystalized magnesium chloride until the mixture has liquified into a pulp, then gradually adding the calcium chloride solution to such pulp with thorough agitation and then dispersing the surface active agent in the mixture. After the mixture stands for about 12 hours, it assumes a pasty consistency.

The pasty consistency of the compositions according to the invention renders it possible to apply large quantities thereof upon mine ceilings and coal faces. When thick layers of such compositions are sprayed upon the mine ceilings and coal faces, they will satisfactorily bind the coal dust contained in the air passing by for periods of weeks and even months. The excellent dust laying capacity of the compositions according to the invention probably is caused by the fact that the water, hygroscopic salt, and surface active agent rapidly and almost completely migrate into the coal dust which is bound by such compositions and consequently are substantially entirely used up in binding the coal dust.

The pasty dust binding compositions according to the invention are preferably blown on the surfaces of the mine ceilings and walls with a compressed air sprayer. The thickness of the sprayed on coatings should not be less than 5 mm.

When the dust binding capacity of the sprayed on coatings is exhausted, they can be regenerated or reactivated by injecting fresh hygroscopic salts in admixture with a surface active agent into the mass, which has been formed of the previously applied coal dust binding composition, coal dust and moisture, with the aid of a compressed air sprayer nozzle. The fresh agents can be injected in solid form or in the form of their aqueous solutions. As regeneration of the dust binding compositions according to the invention only becomes necessary after substantially longer intervals of time than was the case with previously employed coal dust binding compositions, the compositions according to the invention are a considerable advance in the art. Of course, if it is desired, when the original dust binding composition has been exhausted, fresh quantities of the fresh composition may be sprayed thereover to provide for further dust binding capacity.

In the event that the mine surfaces to which the compositions according to the invention are to be applied are porous, it is of advantage to saturate such surfaces or to seal them in order to prevent absorption of the coal dust binding agents from the composition applied. Such saturation or sealing can, for example, be effected by application of solutions of hygroscopic salts, water glass solutions, silicofluoride solutions or emulsions of oils or bitumens.

This application is a continuation-in-part of our copending application S. N. 327,666, filed December 23, 1952 and now abandoned.

We claim:

1. A composition of pasty consistency for binding coal dust in coal mines comprising 1 to 1.5 parts by weight of calcium chloride, 0.04 to 0.08 parts by weight of a non-ionic organic water soluble surface active agent, 0.07 to 0.14 parts by weight of a colloidal magnesium hydroxide produced by reacting hydrated lime with crystalline $MgCl_2.6H_2O$ in a proportion of 1:1 to 1:1.5 and 1.8 to 2.7 parts by weight of water.

2. A composition according to claim 1 in which said non-ionic surface active agent is an alkylphenolpolyglycol ether, the alkyl group of which contains 8 to 10 carbon atoms and the polyglycol component of which contains 20 to 24 carbon atoms.

3. A composition according to claim 1 in which said non-ionic surface active agent is a benzyloxydiphenylpolyglycol ether, the polyglycol component of which contains 28 to 38 carbon atoms.

4. A composition according to claim 1 in which said non-ionic surface active agent is a laurylpolyglycol ether obtained by condensing 1 mol of lauryl alcohol with 7 mols of ethylene oxide.

5. A process for producing a composition for binding coal dust in coal mines which comprises triturating 6 to 11 parts by weight of pulverized hydrated lime and 20 to 33 parts by weight of crystalline $MgCl_2.6H_2O$ until the mixture liquifies to a pulp, mixing 205–230 parts by weight of a 25 to 35% aqueous calcium chloride solution with such pulp and mixing 2 to 5 parts by weight of a non-ionic water soluble surface active agent with such pulp.

6. A process according to claim 5 in which said surface active agent is an alkylphenolpolyglycol ether, the alkyl group of which contains 8 to 10 carbon atoms and the polyglycol component of which contains 20 to 24 carbon atoms.

7. A process according to claim 5 in which said surface active agent is a benzyloxydiphenylpolyglycol ether, the polyglycol component of which contains 28 to 38 carbon atoms.

8. A process according to claim 5 in which said surface active agent is a laurylpolyglycol ether obtained by condensing 1 mol of lauryl alcohol with 7 mols of ethylene oxide.

References Cited in the file of this patent

UNITED STATES PATENTS

| | | |
|---|---|---|
| 995,261 | Kruskopf | June 13, 1911 |
| 1,740,351 | Isobe | Dec. 17, 1929 |
| 2,035,460 | Chesny | Mar. 31, 1936 |
| 2,238,776 | Kleinicke | Apr. 15, 1941 |
| 2,342,150 | Kleinicke | Feb. 22, 1944 |
| 2,448,605 | Kleinicke | Sept. 7, 1948 |

FOREIGN PATENTS

| | | |
|---|---|---|
| 6,343 | Great Britain | of 1913 |
| 280,262 | Great Britain | Nov. 15, 1927 |
| 311,578 | Great Britain | May 16, 1929 |